Nov. 29, 1932.  J. KENNEDY, JR  1,889,444
BRAKE
Filed Oct. 26, 1929   2 Sheets-Sheet 1

INVENTOR
Julian Kennedy Jr
by Byrnes, Stebbins, Parmelee
& Blenko
Attys.

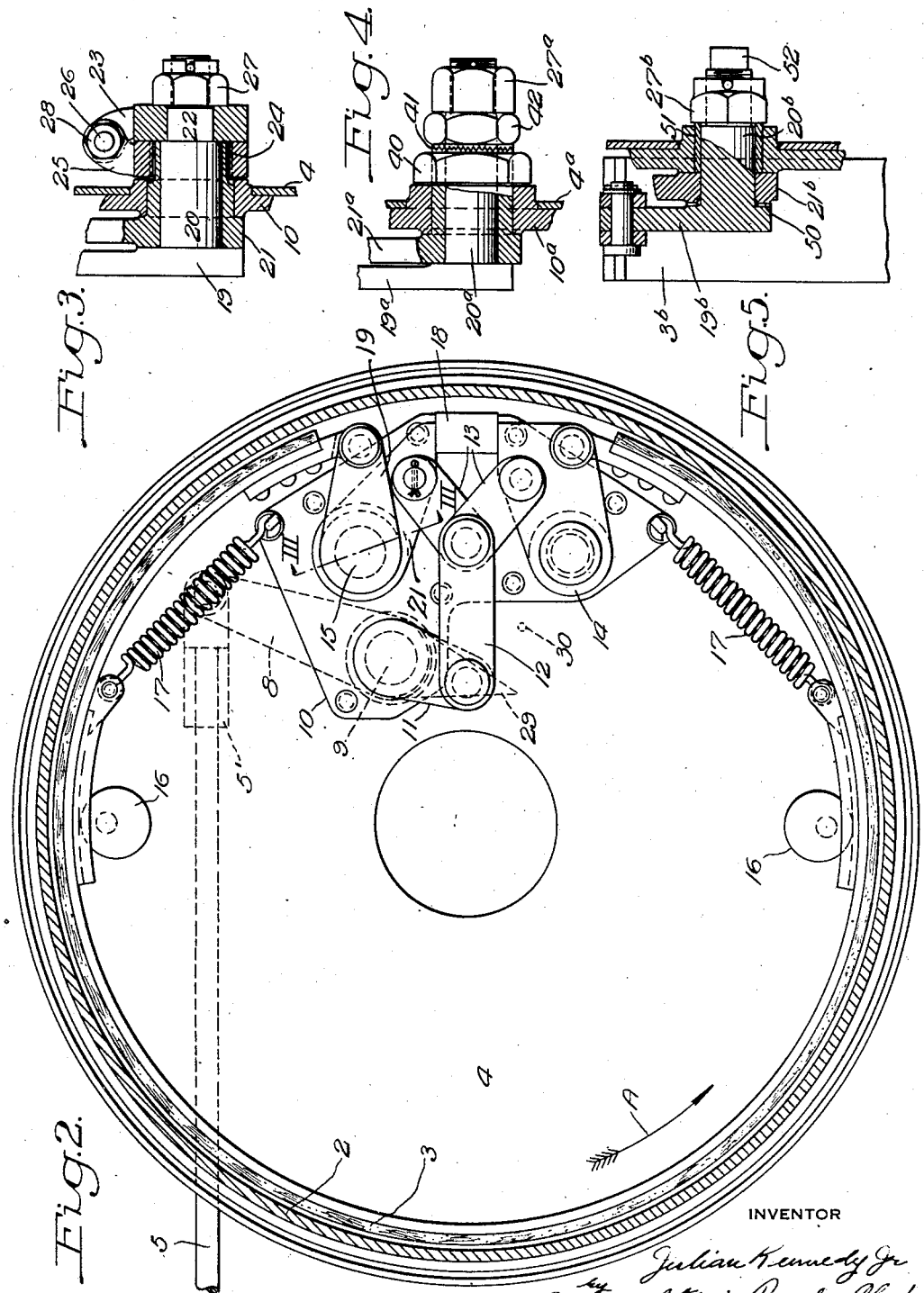

Patented Nov. 29, 1932

1,889,444

UNITED STATES PATENT OFFICE

JULIAN KENNEDY, JR., OF SEWICKLEY, PENNSYLVANIA

BRAKE

Application filed October 26, 1929. Serial No. 402,603.

My invention relates to brakes, and particularly to a vehicle brake which may be readily adjusted.

In automobile brakes as heretofore constructed, it has always been difficult to obtain exact equalization of the braking force between the several brake drums. In four-wheel brakes, particularly, the problem of adjustment has been very difficult because it is desired to exert a definite amount of the braking effort by the front wheels and the remainder by the rear wheels. Because of the difficulties of adjustment, the maximum possible braking power is seldom realized and there is danger of skidding due to certain wheels locking. The problem is rendered more difficult by reason of the fact that toggle mechanisms, because of their strength and low cost, are employed in the brake band operating mechanism. The mechanical advantage of a toggle increases very rapidly as the links thereof approach a straight line relationship.

The brake mechanisms heretofore employed have been such that even though the bands on two brakes engaged their drums at the same moment, there was likely to be a difference in the angular relationship between the toggle links of the two brakes at this moment, and therefore a wide disparity in the amount of braking effort exerted. I provide means whereby the brakes may be adjusted to compensate for wear of the brake linings without affecting the angular relationship between the toggles. It is usual for one brake to wear more rapidly than another, for example, the brakes on the right-hand side of the car are usually subjected to more severe service conditions than those on the left-hand side, because of grit and water from alongside the pavement. This is true even where efforts are made to completely enclose the brakes.

I preferably employ a brake of the self-energizing type and use bell cranks actuated by toggles to expand the brake band against the drum. I so arrange one of the bell cranks that the effective angular distance between its arms may be changed. In this manner the brake is adjusted without affecting the toggle. The toggle arms will therefore always lie in the same angular relationship when the brake is in released position, and by proper adjustment of the bell crank arms the arms will also lie in another fixed relationship when the brake lining first engages the drum.

A great advantage of my construction lies in the fact that the toggles are connected to the brake band through pivoted cranks or arms. It is usual construction to connect the toggles directly to the ends of the brake band. There is, in such construction, always a large force component tending to press the band ends directly radially instead of tangentially as is desired. This direct radial pressure localizes the braking force, causing brake noises and undue localized wear.

I further provide a visual means for indicating the setting of the brakes, whereby an absolute adjustment thereof can be effected even by an unskilled mechanic.

In the accompanying drawings illustrating the present preferred embodiment of the invention and certain modifications thereof Figure 1 is a perspective diagram illustrating a brake linkage;

Figure 2 is a section through a brake embodying the invention;

Figure 3 is a section taken on the line III—III of Fig. 2; and

Figures 4 and 5 are similar views showing modifications.

Figure 1:
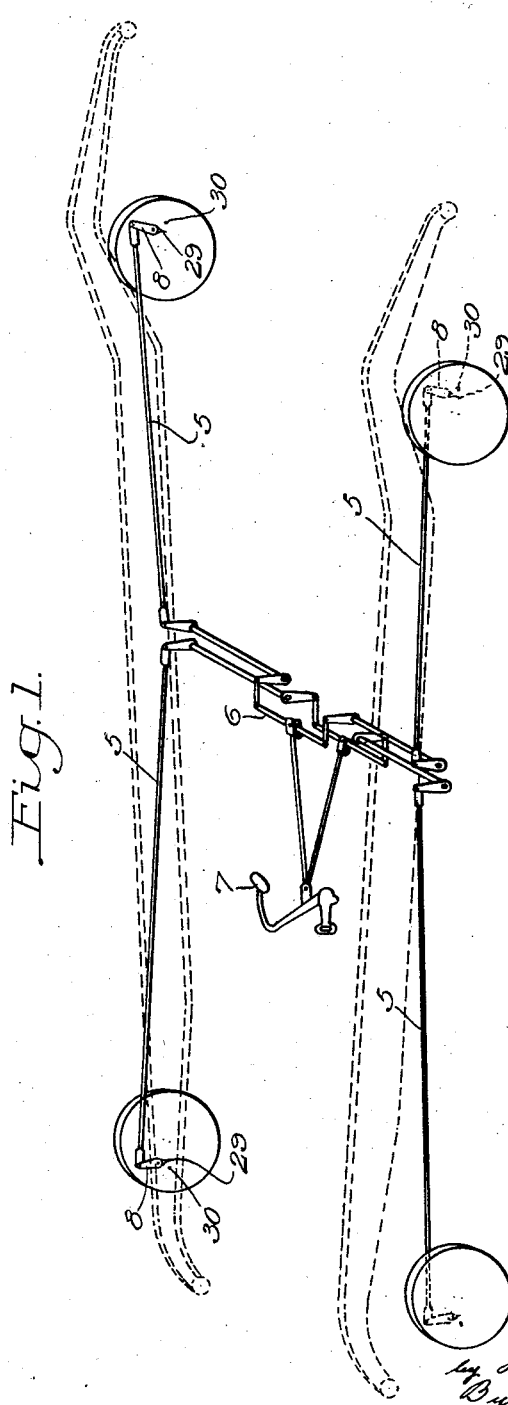

The brake shown in Figs. 2 and 3 comprises a drum 2 secured to the wheel, a band 3, a fixed plate 4 secured to the axle, and operating mechanism carried by this plate for expanding the brake band. Each brake is actuated by a pull rod 5, the pull rods for both the front and rear brakes being connected through equalizers 6 to the foot pedal 7. Fig. 1 shows in diagram a linkage for actuating the brakes. Those parts of the linkage which are used in connection with the front wheels so that the wheels may be turned without disturbing the braking action have all been omitted for the sake of clearness, and a direct connection has been shown. It will be understood, of course, that Fig. 1 is purely diagrammatic and that any desired linkage may be employed.

The pull rod 5 of Fig. 2 is connected to an arm 8 on a shaft 9. The shaft 9 extends through a boss formed on a reinforcing plate 10 secured to the plate 4. At the inner end of the shaft 9 there is an arm 11 which is connected through a link 12 to the middle pivot of a toggle 13. The outer pivots of the toggle 13 are connected to bell cranks indicated generally by the reference characters 14 and 15. The brake band 3 is pivotally connected to these bell cranks. The band is guided on spools 16 carried by the plate 4 and engaging grooved reinforcements on the band. Springs 17 serve to normally retract the band to the position of Fig. 2, in which position the bell cranks 14 and 15 are engaged by a stop block 18.

When the rod 5 is pulled, the toggle is straightened out, thus tending to rock the bell crank 14 clockwise and the bell crank 15 counter-clockwise, expanding the brake band. The arrow A in Fig. 2 indicates the direction of normal running of the vehicle and when the brake is applied with the vehicle running in this direction, the tendency is for the entire brake band, as soon as it engages the drum 2, to rotate with the drum until such movement is stopped by the engagement of the bell crank 14 with the stop block 18. The operation of a brake band of this type is well-known. The amount of pressure adjacent the end at which the bell crank 15 is connected is relatively light, this pressure progressively increasing around the band and being a maximum adjacent the end where the bell crank 14 is connected.

As the toggle links straighten out, the mechanical advantage increases very rapidly and it follows that only a slight difference in angularity between the toggles of two brakes at the moment when their bands first engage the drums will result in a great difference in the braking action. In order to make certain that the angular relationship between the toggle links will be the same at any time on a pair of brakes, I provide for changing the effective angular distance between the arms of the bell cranks 15. This adjustment is made on the bell crank 15 rather than on the bell crank 14 for the reason that, as above stated, the load on the bell crank 15 is materially less than that on the bell crank 14. Of course when the car is backing and the brakes are applied, the result is that the greater load is on the bell crank 15, but the arrangement shown favors the bell crank which is subjected to the least load in normal operation.

Fig. 3 shows the construction of the bell crank 15. It comprises an arm 19 having a stud 20 formed thereon. The second arm 21 of the bell crank is rotatable on the stud 20 and is journaled in the reinforcing plate 10. The stud 20 and the shaft portion of the arm 21 both extend outside the plate 4. The outer end of the stud 20 has a squared portion 22 on which an arm 23 is mounted. The outer end of the shaft portion of the arm 21 is splined, as shown at 24, to carry an arm 25. A bolt 26 connects the arms 23 and 25, and a lock nut 27 holds the parts in assembled position. It will be obvious that by adjusting the bolt 26, the angular relationship between the arms 19 and 21 of the bell crank 15 can be varied as desired. A lock nut 28 is provided on the bolt 26 for holding it in adjusted position.

Assume that the brakes get out of adjustment and it is desired to equalize them. The brake pedal 7 is held or blocked down so as to set the brakes. Each arm 8 carries a pointer 29 arranged to cooperate with a fixed index point 30 on the outer side of the plate 4. It will be seen that when the brakes are thus set, the pointers 29 of the two rear brakes may both lie on the index points 30, in which case the mechanic knows that the toggle links 13 of the two brakes are lying in the same angular relationship. If the pointers 29 are not both lying over their index points 30, then by adjusting the bolt 28 of one brake or the other, the mechanic can change the angular relationship of the arms of one or both of the bell cranks 15 and when he does so, this adjustment will be reflected back through the equalizer so that by continued adjustment he can bring both the pointers 29 up to their index points 30. Equality of braking effort is thus insured and it can be obtained even though one band is badly worn and the other is relatively new. In the event that the braking system does not utilize an equalizer, the mechanic can still get a proper adjustment by adjusting the length of the rods 5, as by threading the clevis 5' on or off the rod, until both pointers 29 lie against their index marks 30, and thereafter adjusting the bell crank arms by the "feel" of the bolts 26.

The front brakes can be similarly equalized and by properly positioning the index points 30 for the front brakes relative to the position of the index points 30 for the rear brakes, any desired distribution of braking effort between the front and rear wheels may be obtained.

Figs. 4 and 5 show modified adjusting means for changing the relative angular position between the bell crank arms. In Fig. 4 parts corresponding to those in Fig. 3 have been given a similar reference character with an *a* suffixed thereto. In this form of the invention, the shaft portion of the arm 21ª carries a splined collar 40 having serrations or teeth 41 formed on the top face thereof. A similar toothed collar 42 is carried on the squared or splined end of the stud 20ª. The collars 40 and 42 may be held in any desired relative position by tightening the nut 27ª so as to hold the teeth of the two collars in engagement. The collars 40 and 42 are made of the same shape as threaded nuts, so that wrenches may be applied thereto for effecting the adjustment.

In Fig. 5 parts corresponding to those in Fig. 3 have been given a similar reference character with a *b* suffixed thereto. In this form of the invention the arm 19$^b$ carries teeth 50 at the junction of the arm proper with the stud 20$^b$. The arm 21$^b$ is provided with cooperating teeth. It is backed by a pressure-transmitting sleeve 51 surrounding the stud 20$^b$ and engaged by a nut 27$^b$. The end of the stud 20$^b$ is squared as indicated at 52 so that the arm 19$^b$ may be rotated. In this form of the invention the nut 27$^b$ is loosened and a wrench applied to the squared end 52 of the stud 20$^b$. There is sufficient side play in the brake band to permit of the teeth 50 clicking over the teeth on the arm 21$^b$ as the desired angular relationship between the two arms is established, whereupon tightening of the nut 27$^b$ will hold the parts in adjusted position.

By my invention the necessity for having special testing machines which determine the braking effort on different wheels is eliminated. The brakes may be adjusted by the average car owner or mechanic without special equipment, and by the mere observation of the pointers 29 when the pedal is depressed, any one can determine whether the brakes are in need of adjustment.

The structure may be manufactured at low cost and the highly efficient and relatively inexpensive toggle may be used. However, the disadvantage of the toggle mechanism is entirely overcome.

I have illustrated and described a present preferred embodiment of the invention and certain modifications thereof. It will be understood, however, that it is not limited to the form shown but may be otherwise embodied within the scope of the following claims.

I claim:—

1. A brake comprising a drum, a cooperating band, a bell crank lever operatively connected to the band, and means for changing the effective angular distance between the bell crank arms.

2. A brake comprising a drum, a cooperating band, a bell crank lever operatively connected to the band, a fixed stop for the bell crank lever, and means for changing the effective angular distance between the bell crank arms.

3. A brake comprising a drum, a cooperating band, a bell crank lever operatively connected to the band, a toggle for actuating the bell crank, and means for changing the effective angular distance between the bell crank arms.

4. A brake comprising a drum, a cooperating band, a bell crank lever operatively connected to the band, a toggle for actuating the bell crank, means for changing the effective angular distance between the bell crank arms independently of the toggle mechanism, and means indicating a given angular position of the toggle arms.

5. A brake comprising a drum, a cooperating internal expanding band, a bell crank lever lying inside the drum and operatively connected to the band, and means operable from outside the drum for changing the effective angular distance between the bell crank arms.

6. A brake comprising a drum, a cooperating band, a pair of bell crank levers operatively connected to the band, and means for changing the effective angular distance between the arms of one of the bell cranks.

7. A brake comprising a drum, a cooperating band, a pair of bell crank levers operatively connected to the band, and means for changing the effective angular distance between the arms of that bell crank which is subject to the lighter load during normal operation of the brake.

8. A brake comprising a drum, a cooperating internal expanding band, a bell crank lever lying inside the drum and operatively connected to the band, one arm of the bell crank lever have a stud projecting outside the assembled brake, and means for adjustably positioning the other arm on the stud.

9. In combination, a pair of brakes having drums, cooperating bands and bell crank levers operatively connected to the bands, and means for changing the effective angular distance between the bell crank arms in the different brakes.

10. In combination, a pair of brakes having drums, cooperating bands and bell crank levers operatively connected to the bands, a common means for actuating the several bell crank levers and operatively connected thereto, means for changing the effective angular distance between the bell crank arms in the different brakes independently of the connection between the actuating means and the bell crank levers, and means indicating a given setting of the brakes.

11. A brake comprising a drum, a cooperating band, a bell crank lever operatively connected to the band, means for changing the effective angular distance between the bell crank arms, means for actuating the bell crank, and means associated with the brake structure for externally indicating a setting of the actuating means.

12. A brake comprising a drum, a cooperating band, a bell crank lever operatively connected to the band, toggle means for actuating the bell crank, means for changing the effective angular distance between the bell cranks, whereby the brake band may be made to initially engage the brake drum at a given angular position of the toggle means, and means for indicating such toggle position.

13. A brake comprising a drum, a cooperating internal band, a bell crank lever lying inside the drum and operatively connected to the band, the arms of the bell crank lever being relatively movable, means associated with each of the arms and projecting outside the assembled brake, externally available means for fixing the relative position of the projecting portions, and means for actuating the bell crank.

14. A brake comprising a drum, a cooperating internal band, a rockable arm, a second arm rockable about the same axis as the first-mentioned arm but movable independently thereof, means for actuating one of the arms, a connection between the other arm and the brake band, and means for securing the arms in a desired adjusted relative position, whereby the arms rock together and constitute a bell crank connection for actuating the band.

15. A brake comprising a drum, a cooperating internal band, a rockable arm, a second arm rockable about the same axis as the first-mentioned arm but movable independently thereof, means for actuating one of the arms, a connection between the other arm and the brake band, and means for securing the arms in a desired adjusted relative position, where by the arms rock together and constitute a bell crank connection for actuating the band, the arms having portions projecting outside the assembled brake to permit of external adjustment.

In testimony whereof I have hereunto set my hand.

JULIAN KENNEDY, Jr.